United States Patent
Macfarlane et al.

(10) Patent No.: US 7,055,303 B2
(45) Date of Patent: Jun. 6, 2006

(54) GAS TURBINE ENGINE ARCHITECTURE

(75) Inventors: Ian Macfarlane, St. Bruno (CA); Zenon Szlanta, Brossard (CA); Lazar Mitrovic, Longueuil (CA); Keith Morgan, Westmount (CA)

(73) Assignee: Pratt & Whitney Canada Corp., Longueuil (CA)

( * ) Notice: Subject to any disclaimer, the term of this patent is extended or adjusted under 35 U.S.C. 154(b) by 182 days.

(21) Appl. No.: 10/740,483

(22) Filed: Dec. 22, 2003

(65) Prior Publication Data

US 2005/0132693 A1 Jun. 23, 2005

(51) Int. Cl.
F02C 7/36 (2006.01)
F02C 7/32 (2006.01)
F02C 7/06 (2006.01)

(52) U.S. Cl. .................. 60/39.08; 60/802; 184/6.11
(58) Field of Classification Search ............ 60/802, 60/796, 797, 798, 799, 39.08; 184/6.11
See application file for complete search history.

(56) References Cited

U.S. PATENT DOCUMENTS

| 2,924,937 | A | * | 2/1960 | Leibach ................. 60/804 |
| 2,978,869 | A | * | 4/1961 | Hiscock et al. ......... 60/802 |
| 3,830,058 | A | * | 8/1974 | Ainsworth ............ 60/226.1 |
| 3,976,165 | A | | 8/1976 | Pilarczyk |
| 4,057,371 | A | | 11/1977 | Pilarczyk |
| 4,594,850 | A | | 6/1986 | Joy |
| 4,682,505 | A | | 7/1987 | Morissette et al. |
| 4,713,982 | A | | 12/1987 | Fluegel et al. |
| 4,756,664 | A | | 7/1988 | Cohen et al. |
| 4,817,382 | A | * | 4/1989 | Rudolph et al. ......... 60/268 |
| 4,887,424 | A | * | 12/1989 | Geidel et al. .......... 60/39.08 |
| 5,110,257 | A | * | 5/1992 | Hibner et al. .......... 60/772 |
| 5,385,011 | A | | 1/1995 | Stewart, Jr. |
| 5,555,722 | A | | 9/1996 | Mehr-Ayin et al. |
| 6,571,563 | B1 | | 6/2003 | Yim et al. |

FOREIGN PATENT DOCUMENTS

EP 0 270 444 6/1987

* cited by examiner

Primary Examiner—Ted Kim
(74) Attorney, Agent, or Firm—Ogilvy Renault LLP

(57) ABSTRACT

A gas turbine engine having an oil cavity architecture and bearing placement which reduce heat rejection and oil system complexity by enclosing the reduction gearbox bearings and at least the shaft bearings supporting the high pressure shaft in the same oil cavity.

20 Claims, 2 Drawing Sheets

GAS TURBINE ENGINE ARCHITECTURE

TECHNICAL FIELD

The present invention relates generally gas turbine engines, and more particularly to an improved architecture for a gas turbine engine.

BACKGROUND OF THE INVENTION

Traditional gas turbine engine layouts necessitate a plurality of oil lubricated bearings spaced apart throughout the engine, and hence require a plurality of oil cavities which contain and feed oil to these bearings. The greater the number of oil cavities required, the greater the cost, weight and complexity of the engine design. Additionally, more oil cavities increases the possibility of potential oil leakages associated with external pipes used to transfer oil to and between the various spaced apart bearing cavities. FIG. 1 illustrates such a typical gas turbine engine layout having six bearing cavities, generally identified as A through F, each of which may comprise several individual bearings therewithin.

SUMMARY OF THE INVENTION

It is an object of the present invention to provide a gas turbine engine having an improved architecture.

Therefore, in accordance with the present invention, there is provided a gas turbine engine comprising: a primary reduction gearbox enclosing a plurality of reduction gearbox bearings therewithin; at least a high pressure shaft rotatably supported by a plurality of high pressure shaft bearings and having a compressor and a turbine mounted thereto; a gas generator portion defining a shaft bearing cavity therewithin, the shaft bearing cavity containing at least the high pressure shaft bearings; and wherein the primary reduction gearbox and shaft bearing cavity are engaged in unrestricted oil flow communication and define a single oil cavity within which the reduction gearbox bearings and the high pressure shaft bearings are enclosed.

There is also provided, in accordance with the present invention, a gas turbine engine comprising: a casing; a primary reduction gearbox having a plurality of reduction gearbox bearings and an accessory gearbox having a plurality of accessory gearbox bearings; at least a first shaft having a compressor and turbine mounted thereto, the first shaft being rotatably supported by at least two shaft bearings; and wherein the reduction gearbox, the accessory gearbox and the shaft bearings are disposed in a single oil cavity within the casing, and wherein unrestricted oil flow is possible between the reduction gearbox bearings, the accessory gearbox bearings and said shaft bearings.

There is further provided, in accordance with the present invention, a gas turbine engine comprising at least outer and inner concentric shafts, at least said outer shaft having a compressor and turbine mounted thereto, each of said shafts being respectively rotatably supported by at least two outer shaft bearings and two inner shaft bearings, the outer shaft bearings being spaced apart from a turbine end of the outer concentric shaft such that the turbine is disposed between said bearing and said end, such that the outer concentric shaft is cantilevered from the outer shaft bearings.

There is also provided, in accordance with the present invention, a free turbine gas engine comprising at least outer and inner concentric shafts rotatably supported by a plurality of shaft bearings, the outer shaft being a free turbine shaft and having a turbine and compressor mounted thereto, the outer shaft bearings disposed forward of the compressor such that the bearings are isolated from the turbine.

BRIEF DESCRIPTION OF THE DRAWINGS

Further features and advantages of the present invention will become apparent from the following detailed description, taken in combination with the appended drawings, in which.

DETAILED DESCRIPTION OF THE PREFERRED EMBODIMENT

Figure 2:
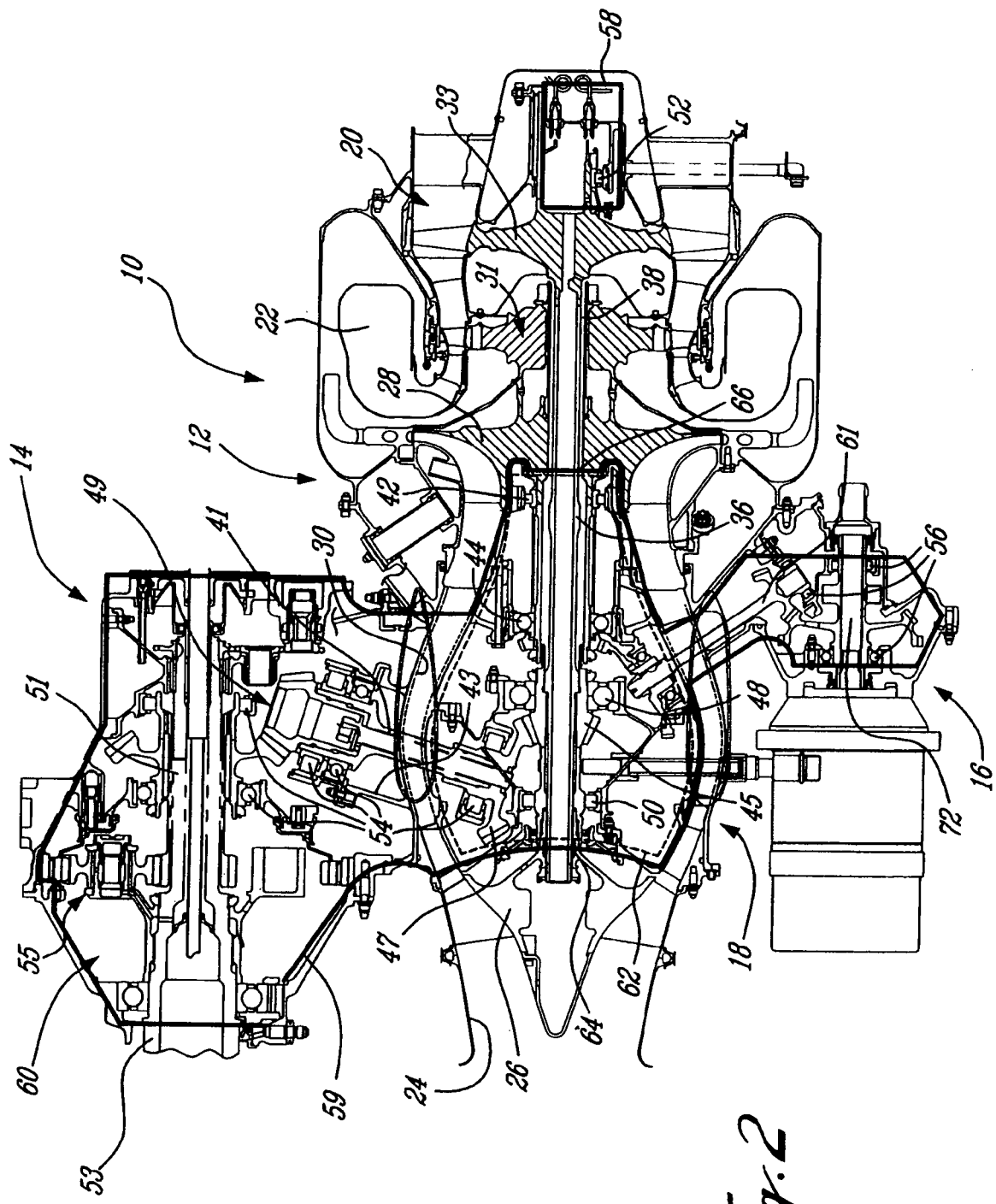
FIG. 2 is a somewhat schematic cross-section view of a gas turbine engine in accordance with the present invention.

Referring to FIG. 2, the gas turbine engine 10 of the present invention is of a type preferably provided for use in subsonic flight and generally described in United States Patent Application Publication No. US2003/0115885 (incorporated herein by reference). The gas turbine engine 10 generally comprises a gas generator module 12 including, in serial flow communication, a multistage compressor portion 18 for pressurizing the air, a combustor portion 22 in which the compressed air is mixed with fuel and ignited for generating an annular stream of hot combustion gases, and a turbine portion 20 for extracting energy from the combustion gases.

The compressor portion 18 includes an air inlet 24, a booster stage or boosted rotor type low pressure (LP) compressor 26 (which may be of the type described in U.S. Pat. No. 6,488,469, incorporated herein by reference), and a centrifugal impeller type high pressure (HP) compressor 28 at the outlet end of a compressor air flow duct 30.

The turbine portion 20 generally includes a high pressure (HP) turbine rotor 31 and a low pressure (LP) turbine rotor 33, mounted to concentric outer HP shaft 38 and inner LP shaft 36 respectively. These main shafts or "spools" are concentrically arranged, preferably with the HP shaft 38 outside the LP shaft 36. This is typically done simply due to geometry restrictions, as the HP shaft generally connects rotating elements which are disposed closer together in the engine. The outer HP shaft 38 drives the HP compressor impeller 28, while the inner LP shaft 36 drives the LP compressor rotor 26. The LP shaft 36 also preferably drives the reduction gearbox module 14 and the accessory gearbox module 16. One will appreciate, however, that these components may be driven by different shafts.

The outer HP shaft 38, concentric with and disposed surrounding the inner LP shaft 36, is cantilevered at the rear of the engine from HP shaft bearings disposed forward of both the HP turbine 31 and the HP compressor 28, within a shaft bearing cavity 62 (indicated with a dashed line in FIG. 2). The shaft bearing cavity 62 preferably includes almost all of the LP and HP shaft bearings, with the exception of the rear LP shaft bearing 52. The shaft bearing cavity 62 opens into, and thus is in free (i.e. unrestricted) fluid flow communication with, both the reduction gearbox 14 and the accessory gearbox 16, thereby defining a large single oil cavity 60 (outlined in FIG. 2 by the large solid line 59) which will be described in greater detail below. The fluid communication between various portions of the single cavity is "unrestricted" in the sense that there is an absence of conduits or other restrictions requiring pressure to force the oil between such portions of the single cavity. Rather, engine attitude permitting, oil may simply flow under force of gravity alone within the various portions of the cavity. Any narrowed portions of the cavity are preferably sized relative to the oil viscosity, etc., so that "spent" oil may pass to the oil-collection portion of the cavity independent of a separate pumping means, as will be described in more detail below. While the shaft bearings used may be of many different types, in the embodiment depicted in FIG. 2 a roller bearing 42 and a ball bearing 44 support the outer HP shaft 38 and engage the shaft forward of the impeller of the HP compressor 28. Atypically, there are thus preferably no bearings located on the HP spool aft of the HP compressor 28. The inner LP shaft 36 is supported at opposed ends, particularly at a forward end by a roller bearing 50 and a main ball bearing 48 and at a rear end by a rear bearing 52. This rear LP shaft bearing 52 can be an oil-less bearing or a bearing having its own cavity.

In use, the operation of the gas generator 12 causes output rotational power to be delivered by the LP turbine shaft 36. As the LP shaft rotates, which can be at speeds upward of 25,000 to 30,000 revolutions per minute (RPM) (the HP shaft rotating at speeds of up to 50,000 RPM or higher), torque is transferred to RGB input shaft 51 via the RGB tower shaft 41, and then through the reduction gear train 55 to the RGB output shaft 53. The reduced speed of the RGB output shaft 53 is typically around 2000 RPM, but will largely depend on the particular application of the engine.

The reduction gearbox module 14 receives input power from the LP shaft 36 via an RGB tower shaft 41, which is in meshed engagement with the LP shaft 36 via bevel gears 45 and 47, respectively disposed on the LP shaft 36 and the tower shaft 41. The tower shaft extends through the inlet gas path 30 within a fairing 43. A bevel gear set 49 transfers rotational power to an RGB input shaft 51 which, in turn, drives an RGB output shaft 53 through a reduction gear train 55. The output shaft 53 terminates (in this example) in a propeller flange (not shown) for connection with a suitable propeller (not shown). A plurality of RGB bearings 54 suitably journal all RGB rotating shafts.

The accessory gearbox module 16 is generally driven by the LP shaft 36 via an AGB tower shaft 61. The AGB output shaft 72 is used to drive accessory devices such as fuel pumps, starter generators, mechanical fuel controls, air/oil separators, and oil pumps, etc. A plurality of AGB bearings 56 suitably journal all AGB rotating shafts.

The term "forward" as used herein is defined as meaning a position within the engine towards the "cool" end of the engine, namely the upstream end of the engine in typical aircraft installations.

By cantilevering the HP shaft 38, the so called "hot end" HP shaft bearing (roller bearing 42) is located forward of both the HP turbine 31 and the HP compressor 28 and within the transmission area of the engine. As this rearmost HP shaft bearing 42 is isolated from the hottest part of the engine, namely the high pressure turbine region, the heat rejection to the oil is therefore greatly reduced. Although cantilevered low-speed shafts are known, cantilevered high-speed shafts are not known nor is the use of this mechanism to isolate the HP bearings from the hottest section of the engine.

Having a cantilevered HP shaft 38 also allows for a simplified assembly/disassembly process. Particularly, the HP turbine rotor 31 and/or the LP compressor rotor 26 can be removed if necessary without disturbing the oil system contained within the monolithic single oil cavity 60. Such simplified assembly/disassembly of elements previously inaccessible without affecting the oil system significantly reduces the possibility of contamination thereof.

Figure 1:
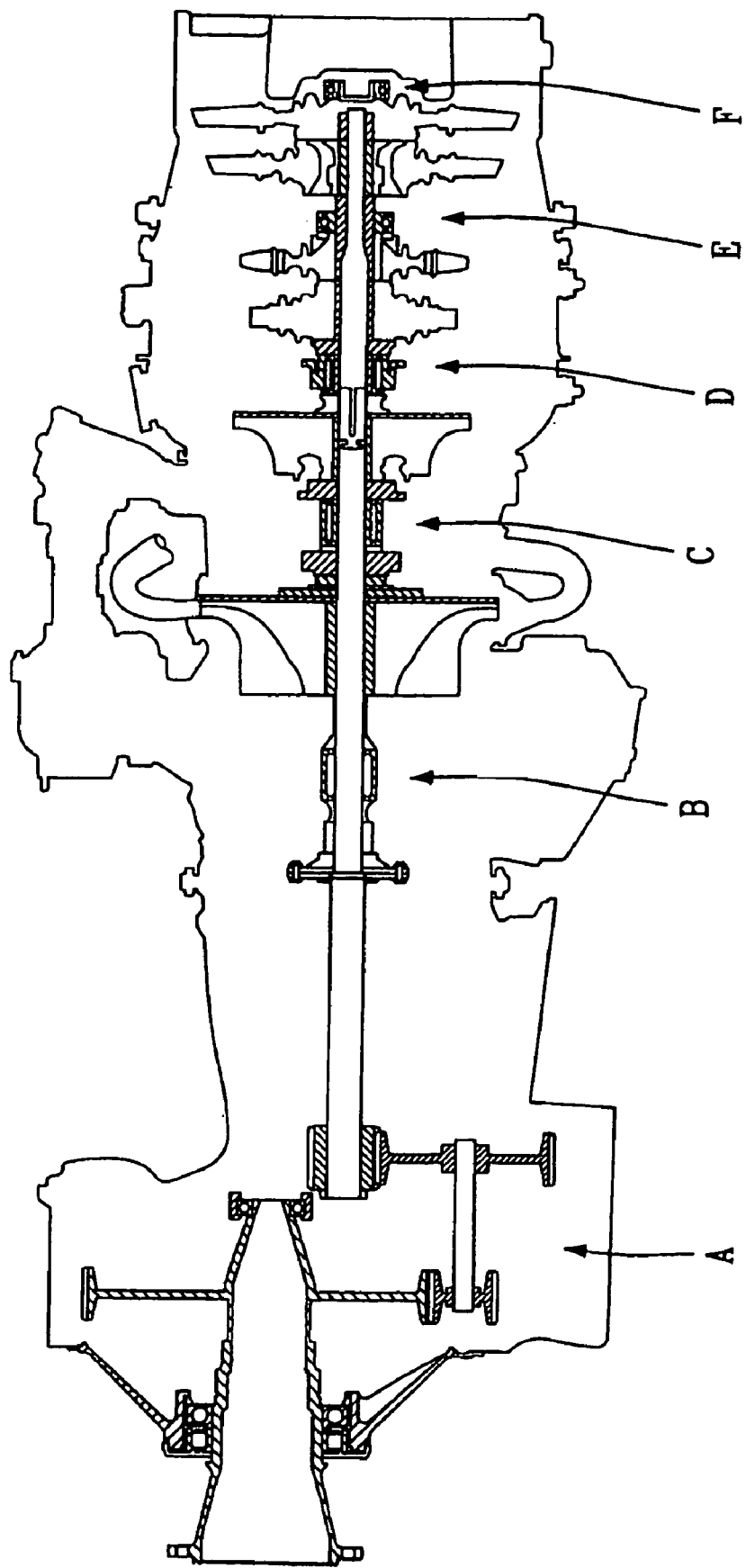
FIG. 1 is a schematic cross-section of a prior art gas turbine engine having a plurality of bearing cavities spaced throughout the engine.

Preferably, the large single oil cavity 60 contains all of the bearings for the reduction gearbox (RGB) 14, the accessory gearbox (AGB) 16 and the outermost main shaft bearings. This engine architecture or layout significantly differs from typical turboprop or turbofan engines, which generally comprise a plurality of bearing oil cavities as depicted in FIG. 1. The novel structure and layout of the present gas turbine engine 10, particularly the offset nature of both the RGB 14 and the AGB 16 and the cantilevered HP shaft 38, permits almost all of the major oil-lubricated bearings to be disposed in the one large bearing oil cavity 60. The single main oil cavity 60 of the present invention permits the deletion of such external pipes and the associated hardware, saving cost and weight.

Further, enclosing all major oil-lubricated bearings, within a single cavity permits the overall heat rejection to the oil to be reduced, thereby lowering oil cooling requirements. As mentioned, this is due in part to the isolation of the bearings relative to the hottest section of the engine, but also in part because the amount of hot secondary air flow blown into the cavity, to create a pressure-differential to seal the oil within the cavity, is reduced due to the reduction in overall number of oil-air interfaces. Particularly, the main bearing cavity 60 preferably comprises only two main shaft seals about the low and high pressure shafts 36,38, a forward shaft seal 64 located just rearward (or downstream) of the boosted LP compressor rotor 26 and a rear shaft seal 66 located just forward (or upstream) of the HP compressor impeller 28. As the amount of secondary air flow into the oil cavity is reduced, the amount of heat which is thus introduced the oil is accordingly reduced. Therefore, the total amount of heat which much be removed from the oil is lower, thereby reducing the size, cost and weight of the oil cooling system required. The main bearing cavity 60 also provides a single large volume of oil having a significant thermal mass, thereby providing a more beneficial mass-to-surface area ratio than possible with several individual smaller cavities further decreasing the engine heat rejection to the oil.

Another advantage of the large main oil cavity 60 is the elimination of the need for a separate AGB oil scavenge system. Particularly, with the present apparatus only gravity is required in normal operating attitudes to drain the oil within the cavity 60 down to the bottom, wherein the oil tank (not shown) is preferably located. Thus, no external or internal pipes or scavenge pumps are necessary. As all main bearings are located within the main cavity 60 and the oil tank is disposed at the bottom thereof, the possibility of an oil flow mismatch between the main oil pressure and that of the scavenge system is therefore eliminated. This significantly reduces the potential for bearing cavity flooding.

The only engine bearing not disposed within the main bearing cavity 60 is the rear LP shaft bearing 52. As noted above, this rear LP shaft bearing 52 is not a major load bearer, and therefore can be a relatively smaller roller or air bearing. If an air bearing is used, no other bearing cavity is required other than the main oil cavity 60. However, if a rolling element bearing (such as a ball or roller bearing) which requires oil lubrication is to be used, a small secondary bearing cavity 58 is provided to contain the oil therein.

Although the present invention has been described and depicted with respect to a turboprop engine, it is to be understood that the present invention may be employed in any gas turbine engine having at least a primary reduction gearbox. Accordingly, turboprop, turboshaft, or geared turbofans, depending on the suitability of their particular layouts, may be configured having the principles of the present invention described above.

The embodiments of the invention described above are intended to be exemplary. Those skilled in the art will therefore appreciate that the forgoing description is illustrative only, and that various alternatives and modifications can be devised without departing from the spirit of the present invention. Accordingly, the present is intended to embrace all such alternatives, modifications and variances which fall within the scope of the appended claims.

The invention claimed is:

1. A gas turbine engine comprising: a primary reduction gearbox enclosing a plurality of reduction gearbox bearings therewithin; at least a high pressure shaft rotatably supported by a plurality of high pressure shaft bearings and having a compressor and a turbine mounted thereto; a gas generator portion defining a shaft bearing cavity therewithin, the shaft bearing cavity containing at least the high pressure shaft bearings; and wherein the primary reduction gearbox and shaft bearing cavity are engaged in unrestricted oil flow communication and define a single oil cavity within which the reduction gearbox bearings and the high pressure shaft bearings are enclosed.

2. The gas turbine engine as defined in claim 1, further comprising an accessory gearbox having a plurality of accessory gearbox bearings, the accessory gearbox being in unrestricted oil flow communication with at least one of the shaft bearing cavity and the primary reduction gearbox such that the single oil cavity defined therewithin encompasses substantially all of the accessory gearbox bearings.

3. The gas turbine engine as defined in claim 2, wherein the single oil cavity comprises an oil tank integral therewith and disposed at the bottom thereof, the single oil cavity being scavenged only by gravity.

4. The gas turbine engine as defined in claim 1, further comprising a low pressure shaft concentrically mounted within the high pressure shaft and rotatably supported by low pressure shaft bearings, and wherein at least some of the low pressure shaft bearings are positioned within the single oil cavity.

5. The gas turbine engine as defined in claim 4, wherein the high pressure shaft surrounds the low pressure shaft, and wherein at least one of the high pressure shaft bearings is inwardly spaced from a rear end thereof such that the high pressure shaft is cantilevered from the high pressure shaft bearings.

6. The gas turbine engine as defined in claim 1, wherein all of said high pressure shaft bearings are located forward of both the compressor and the turbine.

7. The gas turbine engine as defined in claim 1, wherein the single oil cavity comprises only a forward and a rear main shaft air seal to prevent oil therewithin from leaking out around the at least a high pressure shaft, thereby reducing secondary air flow fed into the single oil cavity to seal the oil therewithin.

8. A gas turbine engine comprising:
a casing;
a primary reduction gearbox having a plurality of reduction gearbox bearings and an accessory gearbox having a plurality of accessory gearbox bearings;
at least a first shaft having a compressor and turbine mounted thereto, the first shaft being rotatably supported by at least two shaft bearings; and
wherein the reduction gearbox, the accessory gearbox and the shaft bearings are disposed in a single oil cavity within the casing, and wherein unrestricted oil flow is possible between the reduction gearbox bearings, the accessory gearbox bearings and said shaft bearings.

9. The gas turbine engine as defined in claim 8, further comprising a second shaft concentric within the first shaft and supported by at least two second shaft bearings, at least one of the second shaft bearings being contained in the single oil cavity.

10. The gas turbine engine as defined in claim 9, wherein all bearings of one of the first and second shafts are contained within the single oil cavity.

11. The gas turbine engine as defined in claim 8, wherein the shaft bearings are located forward of both the compressor and the turbine, thereby cantilevering the first shaft.

12. The gas turbine engine as defined in claim 8, wherein the single oil cavity comprises only a forward and a rear main shaft air seal to prevent oil within the single oil cavity from leaking out around said at least first shaft, thereby reducing secondary air flow fed into the single bearing cavity to seal the oil therewithin.

13. The gas turbine engine as defined in claim 8, wherein the single oil cavity comprises an oil tank integral therewith and disposed at the bottom thereof, the single oil cavity being scavenged only by gravity.

14. A gas turbine engine comprising at least outer and inner concentric shafts, at least said outer shaft having a compressor and turbine mounted thereto, the said shafts being respectively rotatably supported by at least two outer shaft bearings and at least two inner shaft bearings, said at least two outer shaft bearings being spaced apart from a turbine end of the outer concentric shaft such that the turbine is disposed between said at least two outer shaft bearings and said end, such that the outer concentric shaft is cantilevered from the outer shaft bearings, and wherein said at least two outer shaft bearings are located forward of the compressor mounted on said outer concentric shaft.

15. The gas turbine engine as defined in claim 14, wherein all of said outer shaft bearings are located forward of both the compressor and the turbine mounted on said outer concentric shaft.

16. The gas turbine engine as defined in claim 15, wherein all of said outer shaft bearings are contained in a single oil cavity.

17. The gas turbine engine as defined in claim 16, wherein at least one of said inner shaft bearings is contained within said single oil cavity.

18. The gas turbine engine as defined in claim 16, further comprising a primary reduction gearbox having a plurality of reduction gearbox bearings, wherein said single oil cavity encompasses all of said reduction gearbox.

19. The gas turbine engine as defined in claim 18, further comprising an accessory gearbox having a plurality of accessory gearbox bearings, wherein substantially all of said accessory gearbox bearings are contained within said single oil cavity.

20. A free turbine gas turbine engine comprising at least outer and inner concentric shafts rotatably supported by a plurality of shaft bearings, the outer shaft being a free turbine shaft and having a turbine and compressor mounted thereto, all outer shaft bearings disposed forward of the compressor such that the bearings are isolated from the turbine.

* * * * *